United States Patent Office 3,361,541
Patented Jan. 2, 1968

3,361,541
INORGANIC POLYMERS
William C. Drinkard, Jr., Wilmington, Del., assignor to E. I. du Pont de Nemours and Company, Wilmington, Del., a corporation of Delaware
No Drawing. Filed Dec. 18, 1963, Ser. No. 331,380
11 Claims. (Cl. 23—358)

ABSTRACT OF THE DISCLOSURE

New boron-cage radicals and wholly inorganic polymers containing these $B_{12}$ boron-cages and a process for their manufacture. The process comprises reacting a lower oxide of a Group VI element in a solution of $(H_3O)_2B_{12}H_{12}$ at a temperature of about 0° C. to 100° C.

---

This invention concerns polymers containing $B_{12}$ boron-cage radicals and more particularly to wholly inorganic polymers containing $B_{12}$ boron-cages.

The term "boron-cage" refers to the twelve boron atoms which are present in the repeating units of the polymers of this invention and which are deemed to be joined to form a skeleton-like unit or cage in which each boron atom is adjacent to five other boron atoms. The manner in which the boron atoms are linked is not known but the group of which the twelve boron atoms are a part functions as a unit in chemical reactions.

There has been considerable interest during recent years in boron chemistry and particularly in boron compounds containing relatively large proportions of boron. Some of these are disclosed in applicant's pending applications S.N. 220,909, filed Aug. 31, 1962; S.N. 220,910, filed Aug. 31, 1962; and S.N. 240,755, filed Nov. 28, 1962, but heretofore polymers containing only inorganic constituents and $B_{12}$ boron-cages in the skeletal chain have not been known.

In accordance with this invention there are provided novel polymers characterized by wholly inorganic backbones containing at least two $B_{12}$ boron-cage radicals in combination with one or more elements having an atomic number of at least 16 and from the sulfur and halogen groups (VI and VII) of the Periodic Table of Elements (Hackh's Chemical Dictionary, 3rd Ed. (1950)). The backbones of the polymers are free from carbon atoms. Organic and/or inorganic substitutents can be attached to backbones of these polymers, but neither is necessary.

Polymers of this invention are characterized by the structural unit:

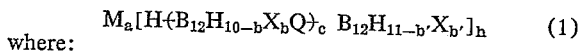

where:

M is a cation,
X is a group which can be bonded to a nuclear carbon of an aromatic ring having benzenoid unsaturation by replacement of hydrogen,

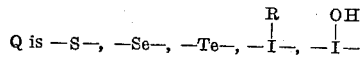

or mixtures thereof $b$ is a positive whole number from 0 to 10, inclusive,
$b'$ is a positive whole number from 0 to 11, inclusive,
$a$ and $h$ are positive whole numbers whose values are determined by the valence $(v_M)$ of M and the valence $(v_{bu})$ of the bracketed unit so that

$c$ is a whole number, greater than zero, referring to the number of parenthetical units in the compound,
R is a monovalent hydrocarbon radical.

When X or R is or contains an organic radical, it may contain from 1 to 30 or more carbon atoms but preferably it contains 1–7 carbon atoms and is phenyl or a lower alkyl group (less than 8 carbon atoms). The term "cation" refers to an atom or group of atoms which forms a positively charged ion in aqueous solution. The term "hydrocarbon radical" refers to a radical of carbon and hydrogen, generally, of which alkyl, aryl, aralkyl, alkaryl and alicyclic radicals are particularly preferred species.

The value of $c$ may range from one in the case of linear dimers to large whole numbers for polymers of high molecular weight, which can be 32,000 or more. The latter are usually gels and are normally insoluble in ordinary solvents other than dimethyl formamide, dimethyl acetamide, etc. Molecular weights of the products are generally governed by the mole ratio of the reactants used. For example, reaction of $(H_3O)_2B_{12}H_{12}$ with $SeO_2$ in a mole ratio of 1:1 produces a gel with high molecular weight having the formula $(B_{12}H_{10}Se \cdot 3H_2O)_n$ where $n$ is a large whole number, but if only ½ mole $SeO_2$ is used, the product is the dimer $[B_{12}H_{11}SeB_{12}H_{11}]^=$, recoverable as a cesium salt $Cs_2[B_{12}H_{11}SeB_{12}H_{11}]$.

M in the formulas is a cation used to fulfill the valence of the boron-cage anion. Since M does not appear in the polymeric product, it is not critical and may be any of the following: hydrogen, ammonium or mono-, di-, or trisubstituted ammonium in which the substituents are hydrocarbyl of up to 12 carbons free of aliphatic unsaturation and in which at most only one such substituent is aryl. Preferably, all substituents are lower alkyl groups.

Also, these polymers can be further reacted to attach substituents to the boron-cages in the polymer as, for example, by halogenation. All, or less than all, of the hydrogen atoms in the boron-cage structure in the polymers can be replaced with halogens (Cl, Br, I or F). Also, reaction of one mole $HB_{12}H_{11} \cdot DMF$ with one-half mole $SeO_2$ in water produces the dimer $$DMF \cdot B_{12}H_{10}SeB_{12}H_{10} \cdot DMF$$

Evaporation of the solution produces a glass. Similarly, by substituting the other oxides mentioned above, for $SeO_2$, inorganic dimers of the Group VI and VII elements mentioned are attained containing DMF groups.

The polymers of this invention are prepared by reacting the $B_{12}H_{12}^=$ ion with a lower oxide of an element of one of the Group VI and VII elements mentioned above. Such a lower oxide is an oxide of one of these elements in which the latter exhibits a valence less than its maximum permissible valence state (e.g., less than 6 for Group VI and less than 7 for Group VII). The reaction is carried out in an acidic solution (having a pH less than about 7) of the $B_{12}H_{12}^=$ ion. Preferably the reaction medium is fairly strongly acidic and has a pH of less than 2 because of the need for the $B_{12}H_{12}^=$ ion to be in the form of its hydronium salt $(H_3O)_2B_{12}H_{12}$. A convenient method of operation involves dissolving a salt such as $(NH_4)_2B_{12}H_{12}$ or $Na_2B_{12}H_{12}$ in water or other suitable solvent, adding a lower oxide of the Group VI or VII element and acidifying by bubbling HCl gas through the reaction mixture or by addition of another acid such as HBr, $H_2SO_4$, $H_3PO_4$, toluene, sulfonic acid, acetic acid, trifluoroacetic acid or the like. If desired, the $B_{12}H_{12}^=$ ion can be used in its acidic form $H_2B_{12}H_{12}$ in which case no additional acid need be used.

Oxides which have been found to be useful for carrying out the process of this invention are lower oxides or substituted oxides of sulfur, selenium, tellurium and iodine. These are conveniently used in the form of $SO_2$, $SeO_2$, $TeO_2$ and $HIO_3$, respectively, or their solvates ($H_2SO_3$, $H_2SeO_3$, $H_2TeO_3$, etc.) where R is a monovalent hydrocarbon radical, but other forms can be used.

The parent oxides useful in this invention contain at least one unit having the following structure:

$$(:)_k \overset{R_n}{\underset{|}{Y}}(O)_p(OH)_m \qquad (2)$$

where (:) represents a non-bonding electron pair attached to Y, Y is Q as defined above; $k$, $p$, $m$ and $n$ are small whole numbers; R is a monovalent hydrocarbon radical; $k$ is 1; $p$ is 0, 1, 2 or 3; $m$ is 0, 1, 2 or 3; $n$ is 0 or 1 and the sum of $k+m+n+$(number of electron pairs bonding oxygen atoms to Y)=4. Representative examples of oxides fitting the above formula are shown in the following table with the number of electron pairs bonding O to Y and values of $p$, $m$ and $n$ indicated.

| Oxide | $p$ | $m$ | $n$ | Number Electron Pairs Bonding O to Y |
|---|---|---|---|---|
| $SO_2$ | 2 | 0 | 0 | 3 |
| $HIO_3$ | 2 | 1 | 0 | 2 |
| $RIO_2$ | 2 | 0 | 1 | 2 |
| $TeO_2$ | 2 | 0 | 0 | 3 |
| $SeO_2$ | 2 | 0 | 0 | 3 |
| $R-\overset{OH}{\underset{|}{X}}=O$ | 1 | 1 | 1 | 1 |
| $H_2SO_3$ | 1 | 2 | 0 | 1 |

The reaction of this invention is carried out in a solution of the $B_{12}H_{12}^=$ ion in a suitable innocuous solvent such as water, dimethyl formamide, dimethyl acetamide, an alcohol, acetonitrile, N-methyl pyrrolidone and the like. The solvent is not critical and any innocuous liquid which dissolves the boron compound can be used. Sometimes the oxide reagent is not soluble in the solvent and the reaction is a two phase reaction.

The reaction of this invention is exothermic and can be conducted at normal room temperature and lower (even at 0° C. in some instances) but slight warming above room temperature is sometimes desirable to shorten the reaction time. With certain oxides cooling may be necessary to prevent overheating. Usually temperatures above about 100° C. are unnecessary and the boiling point of the reaction solution should not be exceeded. Completion of the reaction is indicated by gel formation or increasing viscosity of the reaction solution when the product is a high molecular weight polymer. When low molecular weight polymers are prepared, completion of the reaction is usually indicated by a change in color of the solution. In any event disappearance of the oxide reagent signifies that reaction is completed.

In Formula 1 above, the component represented by X is defined as a group capable of bonding to a ring carbon of an aromatic ring by replacement of hydrogen. An aromatic ring is defined as one possessing benzenoid unsaturation (e.g., as in benzene, naphthalene, xylene, etc.). The group X is preferably a halogen or a monovalent group bonded to boron in the $B_{12}$ cage through nitrogen, carbon, oxygen or sulfur as, for example, in the following groups: amino, substituted amino, nitroso, nitro, azo, alkyl, alkenyl, alkynyl, aryl, alkaryl and aralkyl, cyano, carboxyl, hydroxy, hydrocarbonyloxy, hydrocarbyloxy, thiol, hydrocarbylmercapto, sulfo, sulfonyl and sulfamyl.

The group X can be a substituent on the boron-cage prior to polymerization or can be introduced into the polymers of this invention by direct reaction with those polymers or by substitution for or modification of a group which has been introduced into the polymer by direct reaction (e.g., a substituent obtained by reduction, esterification, hydrolysis, dehydration, or amidation of directly introduced groups). Substituents which are introduced by direct reaction are preferred. Thus, X may be a mixture of the above groups.

Examples of groups included within the scope of X are as follows: halogens (F, Cl, Br, I), hydrocarbon, carboxyl $$(\overset{O}{\underset{\|}{C}}-OH)$$

carbamyl and N-substituted carbamyl $$(\overset{O}{\underset{\|}{C}}-NH_2, -\overset{O}{\underset{\|}{C}}-NHR', -\overset{O}{\underset{\|}{C}}-NR'_2)$$

halocarbonyl $$(-\overset{O}{\underset{\|}{C}}-Y, \text{ where Y is F, Cl, Br, I})$$

halomethyl ($-CH_2Y'$, where Y' is F, Cl, Br, I),
hydroxy ($-OH$),
hydrocarbyloxy ($-OR'$),
acetal [$-CH(OR')_2$],
ketal [$-CR'(OR')_2$],
hydrocarbylcarbonyloxy [$-OC(O)R'$],
hydroxycarbyloxycarbonyl [$-C(O)OR'$],
isocyanate ($-NCO$),
thiocyanate ($-CNS$),
isothiocyanate ($-NCS$),
hydrocarbylthio ($-SR'$),
hydroxymethyl ($-CH_2OH$),
hydrocarbyloxymethyl ($-CH_2OR'$),
dihydrocarbylaminomethyl ($-CH_2NR'_2$),
cyano ($-CN$),
amino ($-NH_2$),
substituted amino ($-NHR'$, $-NR'_2$),
trihalomethyl ($-CCl_3$, $CF_3$, etc.),
acyl $$(\overset{O}{\underset{\|}{C}}-R')$$

aldehyde $$(\overset{O}{\underset{\|}{C}}-H)$$

nitro ($-NO_2$),
nitroso ($-NO$),
azo ($-N=N-Ar$, where Ar is an aromatic hydrocarbon of up to 10 carbons),
sulfo ($-SO_3H$),
sulfonyl ($-SO_2R'$), and
acetoxy-mercury $$(-HgO\overset{O}{\underset{\|}{C}}CH_3)$$

R', where used in the above substituents, is a monovalent organic group which is preferably a hydrocarbon group (alkyl, cycloalkyl, alkenyl, cycloalkenyl, aryl, alkaryl, aralkyl and the like) of at most 18 carbons.

Exampes of reagents which are within the scope of the above definition and which are operable in the process of the invention are given below, together with the substituent group which in the process is bonded to boron in the final product.

| Reagent | Group Bonded to Boron |
|---|---|
| Halogens ($F_2$, $Cl_2$, $Br_2$, $I_2$) | Halogen (F, Cl, Br, I) |
| Nitric acid | $-NO_2$ |
| $H_2NOSO_3Na$ | $-NH_2$ |
| Olefins | $-$alkyl [e.g., $-C_2H_5$, $-CH(CH_3)_2$] |
| Alkyl halides | $-$alkyl |
| Acyl halides | $-\overset{O}{\overset{\|}{C}}-R_1$ |
| $Hg(O\overset{O}{\overset{\|}{C}}CH_3)_2$ | $-HgO\overset{O}{\overset{\|}{C}}CH_3$ |
| $(CN)_2C=C(CN)_2$ | $-(CN)C=C(CN)_2$ |
| $COCl_2$ | $-\overset{O}{\overset{\|}{C}}Cl$ and $-\overset{O}{\overset{\|}{C}}-$ |
| $CO/HCl$ | $-\overset{O}{\overset{\|}{C}}H$ |
| $C_6H_5N(CH_3)CHO/POCl_3$ | $-\overset{O}{\overset{\|}{C}}H$ |
| $R_1SO_2Cl$ | $-SO_2-R_1$ |
| $(R_1)_2N\overset{O}{\overset{\|}{C}}Cl$ | $-\overset{O}{\overset{\|}{C}}N(R_1)_2$ |
| $R_1\overset{O}{\overset{\|}{C}}H$ and $R_2CO$ | $-OR_1$ |
| $(H_3O)^+Cl^-$ (hydronium salt) | $-OH$ |
| $R_1SCl$ | $-SR_1$ |

In the above groups, $R_1$ and $R_2$ are monovalent organic radicals, preferably hydrocarbon of at most 18 carbons, which can be alkyl, alkenyl, cycloalkyl, cycloalkenyl, aryl, alkaryl, aralkyl and the like.

In the reactions employing the above reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of compounds of the formula $H(B_{12}H_{11}\cdot Z)$. The reagents are materials which are usually readily available or which are obtained by conventional methods.

Reaction of the boron compounds of Formula 1 to replace hydrogens on the boron cages with substituent groups is conducted in conventional vessels with corrosion-resistant inner surfaces, e.g., glass, platinum, poly(tetrafluoroethylene) resin and the like. The boron-containing reactant, and optionally an inert liquid solvent, is charged into the reaction vessel. The reactant containing the group to replace hydrogen on the boron cage is then supplied to the reaction vessel at a temperature and at a rate which will provide a controllable reaction and which will bring the reaction to completion within a reasonable time. When reactants are employed which are hydrolytically stable, water or alcohols (methanol, ethanol) can be used conveniently as a medium for the reaction. Other solvents can be used, for example, diethyl ether, benzene, heptane, carbon tetrachloride, carbon disulfide and the like.

The temperature at which the reaction is conducted will be determined largely by the reactivity of the substituting reagent. In general, the temperature will be between about $-20°$ and $200°$ C. Preferably, the temperature will be between about $0°$ and about $150°$ C.

The time of reaction in a batch process will also depend to a considerable extent on the reactivity of the reactants used. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability.

The reaction can be conducted under pressure, if desired, but it is not essential to use pressure. In most cases the reaction proceeds satisfactorily at atmospheric pressure.

The proportions in which the reactants are used are not critical. It is preferable, in order to obtain maximum yield of desired product, to use at least one mole of the substituting reactant for each hydrogen which is to be replaced on the boron-containing reactant. It is not essential, however, that these ratios be used.

Halogenation of the polymers of this invention to replace hydrogen atoms on the boron cages with halogen atoms can be conducted very simply after suspending the $B_{12}$ compound in water. The desired halogen is admixed with the solution at room temperature. Sometimes heating is necessary if a large number of halogens are to be substituted on each cage. The reaction is exothermic and its completion is usually signified by a temperature decline and/or by a color discharge. As many as ten halogens can be substituted on each $B_{12}$ cage in the polymer, eleven halogens on the terminal groups.

When $b$ and $b'$ in Formula 1 is zero, the polymers have the simple formula:

$$M_a[H(B_{12}H_{10}Q)_cB_{12}H_{11}]_h \qquad (3)$$

where the letters have the same meanings as above. These are the preferred forms of the polymers because of their greater simplicity, the ease of their production and the absence of extraneous substituents which may be undesirable in certain applications.

The following are representative polymers of this invention, the terminal groups (see Formula 1) being omitted for convenience:

$$\{B_{12}H_{10}-Se\}_c$$
$$\{B_{12}H_{10}S\}_c$$
$$\{B_{12}H_{10}Te\}_c$$

$$\left[B_{12}H_{10}-\overset{phenyl}{\underset{|}{I}}\right]_c$$

$$\left[B_{12}H_{10}\overset{OH}{\underset{|}{I}}\right]_c$$

$Cs_2(B_{12}H_{11}SeB_{12}H_{11})$
$Cs_2(B_{12}H_{11}SB_{12}H_{11})$
$Cs_2(B_{12}H_{11}TeB_{12}H_{11})$ $$\overset{phenyl}{\underset{|}{Cs_2(B_{12}H_{11}IB_{12}H_{11})}}$$

$$\overset{OH}{\underset{|}{Cs_2(B_{12}H_{11}IB_{12}H_{11})}}$$

$Cs_2[B_{12}H_{11}SeB_{12}H_{10}SeB_{12}H_{11}]$
$Cs_2[B_{12}H_{11}SB_{12}H_{10}SB_{12}H_{11}]$
$Cs_2[B_{12}H_{11}TeB_{12}H_{10}TeB_{12}H_{11}]$
$Cs_2[B_{12}H_{10}ClSeB_{12}H_9ClSeB_{12}H_{10}Cl]$
$Cs_2[B_{12}H_{10}BrSeB_{12}H_9BrSeB_{12}H_{10}Br]$
$Cs_2[B_{12}H_7Br_4SeB_{12}H_6Br_4SeB_{12}H_7Br_4]$
$Cs_2[B_{12}H_{10}OHSeB_{12}H_9OHSeB_{12}H_{10}OH]$

In the above examples "phenyl" is simply illustrative of a preferred hydrocarbon radical. It can be replaced by other monovalent hydrocarbon radicals such as alkyl, aralkyl, alkaryl and alicyclic radicals.

In addition to the above polymers containing $B_{12}$ boron this invention also provides copolymers containing $B_{12}$ and $B_{10}$ boron cages separated in the polymer chain by Q groups as defined above. Applicant's copending application, Ser. No. 331,379, filed on even date Dec. 18, 1963 discloses inorganic polymers of $B_{10}$ boron cages connected in the polymer chain by elements of Group V, VI and VII of the Periodic Table of Elements (Hackh's Chemical Dictionary, 3rd Ed. (1944)). Copolymers containing $B_{12}$ and $B_{10}$ cages can be prepared in accordance with the process of the instant invention by simply substituting for a portion of the $Na_2B_{12}H_{12}$ ordinarily utilized to prepare a $B_{12}$ cage homopolymer of Formula 1 (containing only $B_{12}$ cages in addition to other inorganic elements) a similar quantity of $(NH_4)_2B_{10}H_{10}$. It is necessary of course that the reaction mixture contain sufficient lower oxide of a Q group as defined above or combination thereof to react with all the $B_{12}$ cages desired to be reacted. If a copolymer containing a Group V element is desired, the corresponding $B_{10}$ cage polymer (e.g., a dimer) containing that element is first prepared according to the procedure in the above mentioned copending application and used as a reactant along with the $B_{12}H_{12}^=$-salt (e.g., $Na_2B_{12}H_{12}$) and a lower oxide of Group VI or VII in the process of the instant invention. The resulting copolymer has the composite structure formed by a polymer of the above copending application connected to a polymer of the instant invention by a Q group as defined above.

PREPARATION OF $M_2B_{12}H_{12} \cdot 2H_2O$
(WHERE M IS $Na^+$)

A pressure vessel of 400 ml. capacity is charged with 9.5 g. of sodium hydroborate and 75 ml. of 1,2-dimethoxyethane, also called "glyme." The vessel is closed, cooled to $-80°$ C. and evacuated to a pressure of about 0.001 mm. of mercury. Diborane (14.0 g.) is charged into the vessel which is then sealed and heated with agitation under autogenous pressure for 10 hours at 120° C. The molar ratio of $NaBH_4$ to $B_2H_6$ in this reaction is 1:2. The reactor is cooled, the volatile products are released by venting and the contents of the tube are washed into a receiver with glyme. A suspension of a white solid in a yellow liquid is formed from which the solid is separated by filtration. The solid is dissolved in hot tetrahydrofuran and the solution is filtered to remove a trace of unreacted sodium hydroborate. The hot filtrate is diluted with glyme and chilled to yield 14.0 g. of disodium polyhydropolyborate(2−) as long, glistening white needles. The compound crystallizes with 1,2-dimethoxyethane and water. The compound has the following infrared absorption frequencies: 2.8μ, sharp, medium; 3.9μ with 4.02μ shoulder, sharp, strong; 6.2, 7.8 and 8.4μ, sharp, medium; 9.3μ, medium, sharp, strong; 10.9μ, sharp, strong; and 13.9μ, broad, weak. The compound shows the absorption bands which are characteristic of the dodecahydrodecaborate anion. It has the following elemental analysis:

*Analysis.*—Found: C, 14.33; H, 7.09; B, 45.08; Na, 16.1.

The compound therefore is a solvate of disodium dodecahydrododecarborate having the following composition: $Na_2B_{12}H_{12} \cdot 0.86C_4H_{10}O_2 \cdot 1.25H_2O$.

The compound can be obtained as its hydrate, free of ether of solvation, by recrystallization from a large quantity of diethyl ether or tetrahydrofuran/diethyl ether mixtures, followed by drying under reduced pressure. The ether-free hydrate has infrared absorption characteristics as follows: 2.8μ, sharp, medium; 3.9μ, sharp, strong; 6.2μ, sharp, medium; 9.25μ, sharp, medium; and 13.9μ, broad, medium. The elemental analysis is as follows: Found: H, 6.56; B, 62.02; Na, 20.5.

The compound is therefore a monohydrate of disodium dodecahydrododecarborate, i.e., $Na_2B_{12}H_{12} \cdot H_2O$ (calculated analysis: H, 6.85; B, 63.05; Na, 22.32).

The dihydrate, $Na_2B_{12}H_{12} \cdot 2H_2O$, is obtained in the above process by less intensive drying of the crystals.

PREPARATION OF $H_2B_{12}H_{12} \cdot nH_2O$

A solution of 2.9 g. of $Na_2B_{12}H_{12} \cdot 2H_2O$, obtained above, in 30 ml. of water is passed through a 0.5 inch diameter chromatography column containing 80 ml. of a commercial acidic ion exchange resin ("Amberlite IR 120–H"). The water effluent is clear, colorless and acidic. The column is rinsed with more water until the effluent is no longer acidic and the water fractions are combined. Evaporation of the combined aqueous solutions under reduced pressure (1 mm. of mercury) at a temperature of about 40° C. leaves a white solid residue which has the formula $H_2B_{12}H_{12} \cdot nH_2O$.

The invention will be more clearly understood by referring to the examples which follow. All parts are by weight unless otherwise indicated. In some instances the terminal groups of the polymer products (see Formula 1) have been omitted for convenience.

*Example 1*

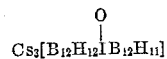

A solution of 1.98 g. of $NaIO_3$ in 20 ml. of water is added dropwise to a solution of 4.48 g. of $$Na_2B_{12}H_{12} \cdot 2H_2O$$

and 10 ml. of concentrated hydrochloric acid in 30 ml. of water. The clear, colorless solution is then warmed at 90° C. for one hour. After cooling the reaction mixture to 25° C., the product is precipitated as a white solid by the addition of 8.0 g. of CsF in aqueous solution. The product which can be represented as

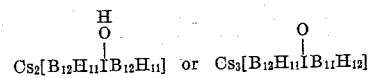

is purified by recrystallization from water.

*Analysis.*—Calcd. for

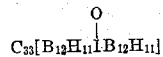

I, 15.5. Found: I, 16.2.

*Example 2*

A solution of 0.79 g. of $TeO_2$ in 5 ml. of concentrated HCl is added to a solution of 2.3 g. of $Na_2B_{12}H_{12} \cdot 2H_2O$ in 10 ml. of water. The solution is warmed on a steam bath for five minutes. During this time the solution becomes deep red-brown in color. Next, 0.55 g. of $SeO_2$ dissolved in 10 ml. of water is added to the red solution and this reaction mixture is warmed on the steam bath for one hour. Then the reaction mixture is allowed to stand overnight at 25° C. During this time it sets to a light tan gel.

Product is recovered by centrifugation and washed with water by centrifugation.

*Example 3*

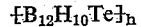

A solution of 1.58 g. of $TeO_2$ dissolved in 10 ml. of concentrated HCl is mixed with a solution of 2.3 g. of $Na_2B_{12}H_{12} \cdot 2H_2O$ disoslved in 10 ml. of water. A light yellow solution results. The solution is then warmed on a steam bath for 30 minutes. During this time the solution gradually becomes deep-red-brown in color and the viscosity gradually increases. After heating for 20 minutes the solution sets to a deep red-brown gel. The gel is broken by stirring and the product is recovered and washed by centrifugation. A brown glossy solid is obtained when the product is dried in vacuum over $P_2O_5$.

*Example 4*

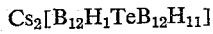

A solution of 0.79 g. of $TeO_2$ (0.005 mole) in 5 ml. of concentrated hydrochloric acid is added dropwise to a solution of 2.3 g. of $Na_2B_{12}H_{12}$ (0.01 mole) in 10 ml. of water. The solution gradually darkens from yellow to deep red-brown. When addition is complete, the reaction mixture is heated at 70–100° C. for thirty minutes and then allowed to cool to 25° C. Product is precipitated as a brown solid by the addition of 4.0 g. of CsF (0.025 mole) dissolved in a minimum of water. The gelatinous solid is recovered by centrifugation and recrystallized from hot water. Yield=2.7 g. (81%).

Infrared bands: 4.0 (BH); 9.6 (B cage); 10.5.

*Analysis.*—Calcd. for $Cs_2[B_{12}H_{11}TeB_{12}H_{11}]$: Te, 18.92. Found: Te, 18.97.

Example 5

$Cs_2[B_{12}H_{11}SeB_{12}H_{11}]$

A solution of 0.55 g. of $SeO_2$ in 10 ml. of water is added to a solution of 2.24 g. of $Na_2B_{12}H_{12}$ in 10 ml. of water. Concentrated hydrochloric acid (5 ml.) is added to the solution and the reaction mixture is heated on the steam bath for 25 minutes. The solution immediately becomes light amber in color. The solution is then cooled to 25° C. and a solution of 6 g. of CsF in 10 ml. of water is added to precipitate the product as a light yellow gelatinous solid. Product is recovered by centrifugation and purified by recrystallization from water. Yield is 1.9 g.

*Analysis.*—Calcd. for $Cs_2[B_{12}H_{11}SeB_{12}H_{11}]$: Se, 12.6; Cs, 42.4; H, 3.5. Found: Se, 12.43; Cs, 45.6; H, 3.14; O, 0.47.

Example 6

$Cs_2[B_{12}H_{11}SeB_{12}H_{10}(OC_3H_7)]$

A solution of 1 g. of $Cs_2[B_{12}H_{11}SeB_{12}H_{11}]$ in 20 ml. of warm water is passed through an "Amberlite IR–120–H" ion exchange column to produce the acid, $(H_3O)_2B_{12}H_{11}SeB_{12}H_{11}$ The solution is evaporated in vacuum at 30° C. to give a yellow oil. The oil is suspended in 20 ml. of glyme and eight drops of propylene oxide are added. The temperature rises rapidly to ca. 32° C. When the mixture cools to 30° C. the glyme is evaporated in vacuum and the residue is dissolved in 30 ml. of ethanol. Product is precipitated as a white solid by the addition of CsF in ethanol until precipitation is complete. The solid is recovered by centrifugation and purified by washing with ethanol. Yield is 1.0 g.

*Analysis.*—Calcd. for $Cs_2[B_{12}H_{11}SeB_{12}H_{10}(OC_3H_7)]$: C, 5.27; H, 4.08. Found: C, 5.64; H, 3.37.

The presence of a B—O bond is confirmed by the infrared spectrum of the product.

Example 7

$(H_3O)_2[B_{12}H_{11}SeB_{12}H_{11}] \cdot 3H_2O$

A solution of 1 g. of $Cs_2[B_{12}H_{11}SeB_{12}H_{11}]$ in 20 ml. of water is passed through an "Amberlite IR–120–H" ion exchange column. The light yellow solution is then evaporated in vacuum at 25° C. to give a light brown solid. The solid is dried 40 minutes in vacuum over $P_2O_5$. Yield is quantitative.

*Anaylsis.*—Calcd. for $(H_3O)_2[B_{12}H_{11}SeB_{12}H_{11}] \cdot 3H_2O$: Se, 17.3. Found: Se, 17.60.

Titration of the acid with NaOH solution shows it to be a strong acid. Both protons titrate simultaneously to give a single break in the titration curve. The solid acid is unstable and slowly evolves a gas.

Example 8

$Cs_2[B_{12}H_{6.5}Cl_{4.5}SeB_{12}H_{6.5}Cl_{4.5}]$

Chlorine gas is bubbled into a suspension of 1 g. of $Cs_2[B_{12}H_{11}SeB_{12}H_{11}]$ in 20 ml. of water for 45 minutes. Initially the temperature rises to 40° C.; and, during the latter stages of reaction, the temperature is maintained at 45° C. by external heating. After the reaction is complete the solvent is removed from the clear colorless solution in vacuum and the residue is crystallized from water-ethanol. Yield is ~0.5 g.

*Analysis.*—Calcd. for $Cs_2[B_{12}H_{6.5}Cl_{4.5}SeB_{12}H_{6.5}Cl_{4.5}]$: Cs, 28.4; Se, 8.42; Cl, 34.0. Found: Cs, 31.5; Se, 6.09; Cl, 33.8, 33.55, 33.94.

Example 9

$[(CH_3CH_2)_4N]_2[B_{12}H_{9.5}I_{1.5}SeB_{12}H_{9.5}I_{1.5}]$

An aqueous solution of KI and $I_2$ is added dropwise to a solution of 5.9 g. of $Cs_2[B_{12}H_{11}SeB_{12}H_{11}]$ in 50 ml. of water at 40° C. Addition of $I_2$ is continued until the color of $I_2$ persists for five minutes. The reaction mixture is then cooled to 25° C. and product is recovered by the addition of aqueous $[(CH_3CH_2)_4N]Cl$ until precipitation is complete. Product is recovered by centrifugation and washed five times with water. Yield is 5.2 g.

*Analysis.*—Calcd. for $[(CH_3CH_2)_4N]_2[B_{12}H_{9.5}I_{1.5}SeB_{12}H_{9.5}I_{1.5}]$ I, 38.2; Se, 7.9. Found: I, 38.84, 38.63, 39.82; Se, 7.78.

Example 10

$[(CH_3CH_2CH_2)_4N]_2[B_{12}H_6Br_5SeB_{12}H_6Br_5]$

A suspension of 5.9 g. of $Cs_2[B_{12}H_{11}SeB_{12}H_{11}]$ in 50 ml. of water is warmed to 40° C. to dissolve the solid. A solution of 5 g. of KBr and 5 g. of $Br_2$ in 40 ml. of water is added dropwise until the color of $Br_2$ persists for five minutes. A solution of $[(CH_3CH_2CH_2)_4N]Br$ in water is then added to the warm solution until precipitation of product is complete. The product is recovered by centrifugation and washed five times with water. Yield is 5.6 g.

*Analysis.*—Calcd. for $[(CH_3CH_2CH_2)_4N]_2[B_{12}H_6Br_5SeB_{12}H_6Br_5]$

N, 1.84; Br, 52.53; Se, 5.19. Found: N, 1.61; Br, 50.67; Se, 5.77.

Example 11

$[B_{12}H_{10}Se]_n$

A solution of 4.48 g. of $Na_2B_{12}H_{12} \cdot 2H_2O$ in 20 ml. of water is mixed with a solution of 2.22 g. of $SeO_2$ in 20 ml. of water. The solution is made acid by the addition of 10 ml. of concentrated HCl and the reaction mixture is heated on a steam bath for 20 minutes. After ~10 minutes of heating the solution suddenly sets to a firm, light tan gel. Heating is continued for 10 minutes after gel formation to insure complete reaction. Product is recovered by stirring to break the gel and centrifuging to recover the amber solid. Soluble impurities are removed by washing with water. The solid is dried in vacuum over $P_2O_5$.

The compounds of this invention are generally useful in the preparation of unsupported films, coating compositions or molded products, all of which can be made by conventional procedures. The $B_{12}$ boron cage polymers are particularly useful in applications where compositions containing a large concentration of boron per unit weight are desirable. Additionally, by proper choice of the X group in Formula 1 $B_{12}$ boron-cage polymers may be prepared which will combine with a wide diversity of other compounds to produce products with a high boron content and having selected properties. They may also be used in pyrotechnics to provide the characteristic boron flame test color.

I claim:

1. A compound characterized by the structural unit:

$M_a[H\text{-}(B_{12}H_{10-b}X_bQ)_cB_{12}H_{11-b'}X_{b'}]_h$ where

M is a cation selected from the group consisting of hydrogen, hydronium, ammonium, substituted ammonium, sodium and cesium, X is a radical selected from the group consisting of halogen, hydrocarbon, carboxyl, carbamyl, N-substituted carbamyl, halocarbonyl, halomethyl, hydroxy, hydrocarbyloxy, acetal, ketal, hydrocarbylcarbonyloxy, hydrocarbyloxycarbonyl, isocyanate, thiocyanate, isothiocyanate, hydrocarbylthio, hydroxymethyl, hydrocarbyloxymethyl, dihydrocarbylaminomethyl, cyano, amino, substituted amino, trihalomethyl, acyl, aldehyde, nitro, nitroso, azo, sulfo, sulfonyl, acetoxymercury and combinations thereof, Q is —S—, —Se—, —Te—

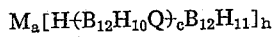

and mixtures thereof,
$b$ is a positive whole number from 0 to 10, inclusive,
$b'$ is a positive whole number from 0 to 11, inclusive,
$a$ and $h$ are positive whole numbers whose values are determined by the valence ($v_M$) of M and the valence ($v_{bu}$) of bracketed unit such that $$(v_M)(a) = (v_{bu})(h)$$

$c$ is a whole number, greater than zero, referring to the number of parenthetical units in the compound,
R is a monovalent hydrocarbon radical containing 1–30 carbon atoms.

2. A compound of claim 1 in which X is halogen.
3. A compound of claim 1 having the formula $$M_a[H(B_{12}H_{10}Q)_cB_{12}H_{11}]_h$$

where the letters have the same significance as in claim 2.
4. A compound of claim 3 in which R is a radical selected from the group of alkyl and aryl.
5. A compound of claim 3 in which Q is an element from Group VI of the Periodic Table of Elements of atomic number 16 or more.
6. A process for preparing a polymer containing a $B_{12}$ boron-cage in the backbone thereof which comprises admixing with a solution containing $(H_3O)_2B_{12}H_{12}$ at a temperature below the boiling point of the solution an oxide having at least one structural unit

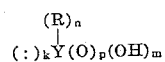

where
(:) is a non-bonding electron pair attached to Y where
Y is an element from the group consisting of S, Se, Te and I, $k$, $p$, $m$ and $n$ are small whole numbers representing the number of the respective parenthetical components in the oxide,
R is a monovalent hydrocarbon radical,
$k$ is one,
$p$ is a number 0–3, inclusive,
$m$ is a number 0–3, inclusive,
$n$ is a number 0–1, inclusive,
$k+m+n+$(number of electron pairs bonding O to Y)$=4$.

7. The process of claim 6 in which the oxide is a lower oxide of a Group VI element.
8. The process of claim 6 in which the temperature is in the range of about 0°–100° C.
9. The process of claim 6 in which the oxide has the formula $$YO_2$$

and Y is a Group VI element of atomic number 16 or more.
10. The process of claim 7 in which the oxide is a lower oxide of selenium.
11. The process of claim 7 in which the oxide is a lower oxide of tellurium.

No references cited.

MILTON WEISSMAN, *Primary Examiner.*

OSCAR R. VERTIZ, *Examiner.*

H. S. MILLER, *Assistant Examiner.*